United States Patent [19]

Oswald et al.

[11] Patent Number: 5,304,587
[45] Date of Patent: Apr. 19, 1994

[54] WATER RESISTANT SECURITY INK COMPOSITION

[75] Inventors: Thomas R. Oswald, Grand Island; James M. Raby, Youngstown, both of N.Y.

[73] Assignee: Moore Business Forms, Inc., Grand Island, N.Y.

[21] Appl. No.: 810,132

[22] Filed: Dec. 19, 1991

[51] Int. Cl.$^5$ .............. B42D 15/00; C09D 11/00; C09D 11/10; B44F 1/12

[52] U.S. Cl. .............. 523/161; 106/21 A; 106/21 R; 524/237; 524/556; 524/95; 525/349

[58] Field of Search ........... 523/161; 524/237, 556, 524/95; 525/349; 106/21 A, 21 R

[56] References Cited

U.S. PATENT DOCUMENTS

| | | | |
|---|---|---|---|
| 1,839,995 | 1/1932 | Remick | 162/140 |
| 1,911,774 | 5/1933 | Smith | 428/29 |
| 2,767,154 | 10/1956 | Weihe | 524/237 |
| 3,802,724 | 4/1974 | Gosnell | 283/109 |
| 3,870,841 | 3/1975 | Makowski et al. | 524/237 |
| 4,037,007 | 7/1977 | Wood | 162/140 |
| 4,170,578 | 10/1979 | Schelhaas | 524/28 |
| 4,171,982 | 10/1979 | Lin | 106/21 A |
| 4,227,719 | 10/1980 | McElligott et al. | 283/92 |
| 4,478,681 | 10/1984 | Muller et al. | 283/92 |
| 4,540,628 | 9/1985 | Oberdeck et al. | 428/336 |
| 4,710,617 | 12/1987 | Mouchotte | 283/95 |
| 5,058,925 | 10/1991 | Dotson | 106/21 R |
| 5,085,925 | 2/1992 | Hiraoka et al. | 428/522 |

FOREIGN PATENT DOCUMENTS

| | | | |
|---|---|---|---|
| 530025 | 6/1983 | Australia | |
| 0044378 | 1/1982 | European Pat. Off. | 524/556 |
| 0008133 | 3/1976 | Japan | 524/237 |
| 200568 | 1/1987 | Japan | 523/161 |
| 0336237 | 9/1930 | United Kingdom | 524/237 |
| 2094820 | 9/1982 | United Kingdom | 523/161 |

OTHER PUBLICATIONS

Chemical Abstracts, vol. 93, No. 22, Dec. 1, 1980, Oji paper Co., Ltd., Abekawa Paper Co., Ltd.; Abstract No. 206440, "Paper for Preventing Forgery", p. 104, col. 1.

Abstract-Derwent Publications Ltd., AN 74-33529; JP-A-49 005 047 (Ricoh Co. Ltd.) Jan. 17, 1974.

Apr. 7, 1993 Communication from European Patent Office, EP 92 310687.6, Search Report and Annex to Search Report.

*Primary Examiner*—paul R. Michl
*Assistant Examiner*—Andrew E. C. Merriam
*Attorney, Agent, or Firm*—Finnegan, Henderson, Farabow, Garrett & Dunner

[57] ABSTRACT

A security composition for use with an ink composition including diphenylguanidine and acrylic resin. The ink composition may further include a glycol ether and a plasticizer and can be printed on paper, for example in the word "VOID". If bleach is used to attempt to alter the document, the initially colorless ink will form a colored image in the shapes or letters printed on the paper. The ink composition is resistant to leaching upon contact with, for example, water.

30 Claims, No Drawings

WATER RESISTANT SECURITY INK COMPOSITION

BACKGROUND OF THE INVENTION

1. Field of Invention

This invention relates to a leach resistant CHLOROSTAIN ink composition. The invention also relates to the use of the leach resistant ink as a security ink, i.e., for application to a document to prevent alteration of information on the document. The invention further relates to a method of forming a document having the security ink thereon.

2. Description of The Prior Art

CHLOROSTAIN-based security inks are initially colorless inks which are printed on a document, for example in the word "VOID". If bleach or some other oxidizing agent is used in an attempt to alter the document, the colorless ink forms a colored image in the shapes or letters printed on the paper.

CHLOROSTAIN-based security inks suffer from the problem that unimaged CHLOROSTAIN can be easily washed out with water. Some government jurisdictions have begun requiring that CHLOROSTAIN security features be water resistant in the unimaged state for up to one hour.

The use of benzothiazole compounds such as CHLOROSTAIN OR (Mobay Corp. Pittsburgh, Pa.) in ink compositions to prevent document alteration is known. For example, U.S. Pat. No. 4,227,719 to McElligott et al. discloses a CHLOROSTAIN OR-based security ink. However, McElligott et al., like other known CHLOROSTAIN-based security inks, suffers from the problem that the ink is not water resistant and can be washed out upon contact with water.

Recently, a security ink using N-N-diphenylguanidine (Tradename: CHLOROSTAIN BR, by Mobay Corp.) has been disclosed that provides improved water resistance. U.S. Pat. No. 5,085,925 to Dotson discloses a leach resistant security ink that includes CHLOROSTAIN BR. However, the security ink disclosed by Dotson suffers from several drawbacks. The ink composition requires the use of a complexing agent, such as glucose, sucrose, sorbitol and the like, to provide resistance to leaching. The ink disclosed in Dotson further requires the use of a separate fixing agent and fixing step to bind the ink composition to the document substrate. The separate fixing step requires either two passes through a printing or coating head or two units on the press or coater for this ink alone while the ink of the present invention only requires one print station. Further, the carrier liquid of Dotson is either alcohol, which is flammable, and therefore potentially dangerous, or water, which may distort the paper and will require drying. Further, the two step Dotson operation will either limit the other printing that can be done in one pass or will raise the cost if another printing or coating unit is added or if the paper is run through twice.

An object of the present invention is to provide a security composition that can be applied to a document to prevent unauthorized alteration of the document by the use of oxidizing agents.

Another object of the present invention is to provide an ink composition that, while initially colorless, changes color upon contact with oxidizing agents and additionally, can not be easily leached out with water.

Another object of the invention is to provide a leach resistant ink composition which does not require the use of a complexing agent.

A further object of the invention is to provide a document protected against alteration by use of a security ink composition, which composition can be applied to the document without a fixing agent or a fixing step.

SUMMARY OF THE INVENTION

These and other objects have been achieved by the present invention which relates to a security composition for use in an ink formulation. The security composition includes a resin and a diphenyl guanidine compound.

The present invention also relates to a leach resistant ink composition comprising a diphenyl guanidine compound, a resin, a plasticizer and a glycol ether. The ink of the present invention is leach resistant in both the imaged and unimaged states.

The invention further relates to a document resistant to alteration by oxidizing agents. The document comprises a substrate and the ink composition of the present invention. The ink composition can be applied to the document substrate without a fixing agent and without a separate fixing step.

The ink of the present invention is particularly useful as a security feature on documents where it is important that any attempts at alteration be exposed. The colorless ink of the present invention can be printed on paper, for example in the word "VOID". When bleach is used to attempt to alter the document, the colorless ink of the present invention will form a colored image in the shapes or letters printed on the paper.

Additional objects and advantages of the invention will be set forth in part in the description which follows, and in part will be obvious from the description, or may be learned by practice of the invention. The objects and advantages of the invention can be realized and attained by means of the elements and combinations particularly pointed out in the appended claims.

DESCRIPTION OF THE PREFERRED EMBODIMENTS

The ink composition of the present invention can be printed on a substrate in a manner so that, upon attempt to alter the substrate, the initially colorless ink of the present invention will form a colored image in the shapes or letters printed on the paper.

According to the present invention, suitable substrates include paper or paperboard and may be made from natural or synthetic materials, such as films, fabrics, foils, natural and synthetic papers and other media. Preferred substrates are natural fiber papers where enhanced security is needed. These may include light and heavy weight papers, coated paper, and security paper.

The ink composition of the present invention may be coated over the entire surface of the document substrate or may be coated on selected portions thereof. The ink may be coated in a pattern of tamper indicated indicia, for example, in the word "VOID" or may be coated on the surface of the substrate in a continuous film.

The security composition of the invention comprises a resin and diphenyl guanidine. This composition provides a security feature in that it becomes colored upon contact with oxidizing agents and, additionally, is resistant to being leached out from a substrate by water or other liquids. This basic security composition can be utilized with various other known ink composition components in the formulation of a leach resistant ink composition.

The leach resistant ink composition of the invention includes a resin, diphenyl guanidine, a glycol ether and a plasticizer. The resin can be selected from typical ink formulating resins, including acrylic and acrylic copolymer resins and emulsions, epoxy resins, melamine-formaldehyde resins, polyvinyl acetates, phenolic modified resins, glycerol esters of synthetic resins, phenolic-modified pentaerythritol esters of synthetic resins, etc. The preferred resin is an acrylic resin, and even more preferably is JONCRYL 67 (produced by S.C. Johnson & Sons). JONCRYL 67 is a styrene acrylic polymer resin. The resin is preferably present in an amount from about 1 to 24% by weight, and more preferably in an amount of about 8% to 15% by weight based upon the final composition.

Preferred diphenyl guanidine compounds for use according to the present invention include the compound N-N-diphenyl guanidine, which is believed to be the active component in CHLOROSTAIN BR. The diphenyl guanidine is preferably present in an amount from about 1 to 30% by weight based upon the final composition, more preferably an amount of about 5% to 21% by weight. In a preferred embodiment, the diphenyl guanidine is present in an amount of about 12% by weight based upon the final composition.

Glycol ether compounds useful in the ink composition of the present invention include ethylene and propylene based glycol ethers and glycol ether esters. Preferably, the glycol ether compound is selected from methyl cellosolve and methyl carbitol. More preferably, the glycol ether compound is methyl carbitol. The glycol ether compound is preferably present in an amount from about 29% to 59% by weight based upon the final composition. In a preferred embodiment, the glycol ether compound is present in an amount of about 59% by weight based upon the final composition.

Plasticizers useful in the ink composition of the present invention include diethylene glycol, diethylene glycol monoethyl ether, diethyl phthalate, dibutyl phthalate, methyl phthalate, triethanolamine, triethyl citrate, tributoxyethyl phosphate, o,p-toluene ethyl sulfonamide, o,p-toluene sulfonamide and methyl phthalyl ethyl glycolate. Preferably, the plasticizer is selected from dibutyl phthalate, diethyl phthalate and methyl phthalate. More preferably, the plasticizer is dibutyl phthalate. The plasticizer is preferably present in an amount from about 0 to 10% by weight based upon the final composition, more preferably in an amount of about 1% to 3% by weight. In a preferred embodiment, the plasticizer is present in an amount of about 2% by weight based upon the final composition.

The ink composition of the present invention may further include a benzothiazole compound, a solvent or combinations thereof.

The preferred benzothiazole compound useful in the ink composition of the present invention is Chlorostain OR. The benzothiazole compound is preferably present in an amount from about 0 to 45% by weight based upon the final composition, more preferably in an amount of about 15% to 21% by weight. In a preferred embodiment, the benzothiazole compound is present in an amount of about 15% by weight based upon the final composition.

Solvents that are useful in the ink composition of the present invention may include alcohols, such as isopropanol, propanol, ethanol, methanol, and tridecyl alcohol. More preferably, the solvent is isopropanol. The solvent is preferably present in an amount from about 0% to 37% by weight.

The ink composition according to the present invention can be printed onto a document substrate using printing methods known in the art. Among the preferred methods of printing are flexographic and gravure printing.

Once the ink composition has been printed onto the substrate, no additional fixing step is necessary to bind the ink to the substrate. The composition of the invention resists leaching by techniques such as soaking in water, etc. Upon an attempt at alteration of information on the document, for example by contact with bleach, the colorless ink composition will form a colored composition indicating the tampering.

A preferred ink composition according to the present invention comprises
- about 29-59% by weight methyl carbitol,
- about 1-3% by weight dibutyl phthalate,
- about 8-15% by weight ioncryl 67 acrylic resin,
- about 15-21% by weight CHLOROSTAIN OR, and
- about 5-21% by weight CHLOROSTAIN BR.

The above composition has a flash point greater than 200° F., enabling its use in equipment that is not explosion proof. In a preferred embodiment of the invention, both CHLOROSTAIN OR and CHLOROSTAIN BR are used. CHLOROSTAIN OR is more easily washed out but develops a color rapidly. CHLOROSTAIN BR is resistant to leachout but is slower to develop color. Thus, by varying the relative proportions of CHLOROSTAIN OR and CHLOROSTAIN BR present in the composition, the overall ink properties can be selectively controlled to achieve the desired results.

The following examples are illustrative of the invention embodied herein but are not intended to be limiting in any way.

EXAMPLE 1

In a five gallon plastic bucket, 17.7 lbs. of methyl carbitol, and 0.6 lbs. of dibutyl phthalate were mixed. The mixture was stirred with an air driven stirrer. To this mixture, 3.6 lbs. of ioncryl 67 resin was slowly added. The mixture was stirred until the acrylic resin was dissolved, approximately 2 hours. Next, 4.5 lbs. of CHLOROSTAIN OR liquid was added and the mixture was stirred until the liquid was completely dissolved, approximately 15 minutes. 3.6 lbs. of CHLOROSTAIN BR solid was then added with stirring until it was dissolved, approximately 30 minutes. The ink was ready for use.

The quantities used in Example 1 represent the following percents:

|  | Pounds | Wt. % |
|---|---|---|
| Methyl carbitol | 17.7 | 59.0 |
| Dibutyl phthalate | 0.6 | 2.0 |
| Joncryl 67 | 3.6 | 12.0 |
| CHLOROSTAIN OR | 4.5 | 15.0 |
| CHLOROSTAIN BR | 3.6 | 12.0 |

EXAMPLE 2 (COMPARATIVE)

A control formula of Chlorostain BR solution was made by mixing 0.38 grams 30% hydrochloric acid in 175 grams of tap water. While mixing, 19.49 grams of solid Chlorostain BR was added. This was mixed until dissolved. The solution was hand printed onto 24 # OCR bond paper and tested as described in Example 3 below. The results are shown in Tables 1,2,5 and 6.

EXAMPLE 3

In a five gallon plastic bucket, 1917.5 g of isopropanol, 1917.5 g of methyl cellosolve and 130.0 g of dibutyl phthalate were mixed. The mixture was stirred with an air driven stirrer. To this mixture, 780.0 g of Joncryl 67 resin was added. The mixture was stirred until the acrylic resin was dissolved, approximately 1 hour. Next, 975.0 g of CHLOROSTAIN OR liquid was added and the mixture was stirred until the liquid was completely dissolved, approximately 15 minutes. 780.0 g of CHLOROSTAIN BR solid was then added with stirring until it was dissolved, approximately 30 minutes.

The resulting ink was printed on 24 # OCR bond paper. Six 1 inch×6 inch strips were then cut and half of the strip was activated to form the image using diluted household bleach and a cotton swab. The strips were allowed to dry for one half hour. The strips were then placed in 110° F. water and allowed to soak. A strip was removed from the beaker at 5, 15, 30, 60, 120 and 240 minutes and allowed to dry. Each strip was reactivated with diluted bleach on the half that was not activated prior to the hot water soak. The results compare the water resistance of the imaged and unimaged ink. See Tables 1 and 2.

The quantities used in Example 3 represent the following percents:

|  | Grams | Wt. % |
| --- | --- | --- |
| Isopropanol | 1917.5 | 29.5 |
| Methyl cellosolve | 1917.5 | 29.5 |
| Dibutyl phthalate | 130.0 | 2.0 |
| Joncryl 67 | 780.0 | 12.0 |
| CHLOROSTAIN OR | 975.0 | 15.0 |
| CHLOROSTAIN BR | 780.0 | 12.0 |

EXAMPLE 4

Example 4 was carried out in the same manner as Example 3, using the following compounds and amounts:

|  | Grams | Wt. % |
| --- | --- | --- |
| Isopropanol | 1917.5 | 29.5 |
| Methyl cellosolve | 1917.5 | 29.5 |
| Dibutyl phthalate | 130.0 | 2.0 |
| Joncryl 67 | 780.0 | 12.0 |
| CHLOROSTAIN OR | 1365.0 | 21.0 |
| CHLOROSTAIN BR | 390.0 | 6.0 |

EXAMPLE 5 (COMPARATIVE)

Example 5 was carried out in the same manner as Example 3, using the following compounds and amounts:

|  | Grams | Wt. % |
| --- | --- | --- |
| Isopropanol | 1917.5 | 29.5 |
| Methyl cellosolve | 1917.5 | 29.5 |
| Dibutyl phthalate | 130.0 | 2.0 |
| Joncryl 67 | 780.0 | 12.0 |
| CHLOROSTAIN OR | 1755.0 | 27.0 |

The resulting ink is a control ink using only CHLOROSTAIN OR without the use of any CHLOROSTAIN BR.

EXAMPLE 6

Example 6 was carried out in the same manner as Example 3, using the following compounds and amounts:

|  | Grams | Wt. % |
| --- | --- | --- |
| Isopropanol | 2405.0 | 37.0 |
| Methyl cellosolve | 2405.0 | 37.0 |
| Dibutyl phthalate | 130.0 | 2.0 |
| Joncryl 67 | 780.0 | 12.0 |
| CHLOROSTAIN BR | 780.0 | 12.0 |

From Table 2, it can be seen that when the inks were imaged before being soaked, complete water washout only occurred in Example 5, which contains only CHLOROSTAIN OR, with CHLOROSTAIN BR being absent. From Table 1, when the same inks were soaked before imaging, Examples 3, 4 and 6 gave acceptable results. Comparative Examples 2 and 5 were the only inks showing complete water washout before 240 minutes.

EXAMPLE 7

Example 7 was carried out in the same manner as Example 1, using the following compounds and amounts:

|  | Wt. % |
| --- | --- |
| Methyl carbitol | 29.5 |
| Dibutyl phthalate | 2.0 |
| Isopropyl Alcohol | 29.5 |
| Joncryl 67 | 12.0 |
| CHLOROSTAIN OR | 15.0 |
| CHLOROSTAIN BR | 12.0 |

EXAMPLE 8

In a five gallon plastic bucket, 8.85 lbs. of methyl carbitol, 8.85 lbs. of isopropyl alcohol and 0.6 lbs. of dibutyl phthalate were mixed. The mixture was stirred with an air driven stirrer. To this mixture, 3.6 lbs. of Joncryl 67 resin was added. The mixture was stirred until the acrylic resin was dissolved, approximately 1 hour. Next, 4.5 lbs. of CHLOROSTAIN OR liquid was added and the mixture was stirred until the liquid was completely dissolved, approximately 15 minutes. 3.6 lbs. of CHLOROSTAIN BR solid was then added with stirring until it was dissolved, approximately 30 minutes.

The resulting ink was printed on 24# OCR bond paper and 99# TAG paper. Strips were then cut and half of the strip was activated using diluted household bleach and a cotton swab. The strips were allowed to dry for one half hour. The strips were then placed in 110° F. water and allowed to soak. A strip was removed from the beaker at 5, 15, 30, 60, 120 and 240 minutes and allowed to dry. Each strip was reactivated with diluted bleach on the half that was not activated prior to the hot water soak. The results compare the water resistance of the imaged and unimaged ink. See Tables 3 and 4.

The quantities used in Example 8 represent the following percents:

|  | Pounds | Wt. % |
|---|---|---|
| Isopropyl alcohol | 8.5 | 29.5 |
| Methyl carbitol | 8.5 | 29.5 |
| Dibutyl phthalate | 0.6 | 2.0 |
| Joncryl 67 | 3.6 | 12.0 |
| CHLOROSTAIN OR | 4.5 | 15.0 |
| CHLOROSTAIN BR | 3.6 | 12.0 |

As can be seen in FIGS. 3 and 4, the ink was not susceptible to water washout in either the imaged or unimaged states.

EXAMPLE 9

The following ingredients were dissolved by mixing:

|  | GRAMS | % |
|---|---|---|
| Foral 65 (glycerol ester of synthetic resin) (Hercules) | 24 | 8.3 |
| Methyl carbitol | 118 | 40.7 |
| Isopropyl alcohol | 118 | 40.7 |
| Chlorostain BR | 30 | 10.3 |

The solution was hand coated onto 20# Xerographic paper using a smooth rod. The samples were dried and tested as before.

EXAMPLE 10

The following ingredients were dissolved by mixing:

|  | GRAMS | % |
|---|---|---|
| Epon 1002 (epoxy resin) (Shell) | 24 | 13.9 |
| Methyl carbitol | 118 | 68.6 |
| Chlorostain BR | 30 | 17.4 |

The solution was hand coated onto 20# Xerographic paper using a smooth rod. The samples were dried and tested as before.

EXAMPLE 11

The following ingredients were dissolved by mixing:

|  | GRAMS | % |
|---|---|---|
| Parez 613 (melamine formaldehyde resin) (American Cyanamid) | 24 | 13.9 |
| Methyl carbitol | 118 | 68.6 |
| Chlorostain BR | 30 | 17.4 |

The solution was hand coated onto 20# Xerographic paper using a smooth rod. The samples were dried and tested as before.

EXAMPLE 12

The following ingredients were dissolved by mixing:

|  | GRAMS | % |
|---|---|---|
| Mowilith 50 (Polyvinyl acetate) (Hoechst Chemical) | 24 | 8.3 |
| Methyl carbitol | 118 | 40.7 |
| Isopropyl alcohol | 118 | 40.7 |
| Chlorostain BR | 30 | 10.3 |

The solution was hand coated onto 20# Xerographic paper using a smooth rod. The samples were dried and tested as before.

EXAMPLE 13

The following ingredients were dissolved by mixing:

|  | GRAMS | % |
|---|---|---|
| Polypale ester 10 (glycerol ester of synthetic resin) (Hercules) | 24 | 8.3 |
| Methyl carbitol | 118 | 40.7 |
| Isopropyl alcohol | 118 | 40.7 |
| Chlorostain BR | 30 | 10.3 |

Not all of the resin dissolved in 24 hours. The clear liquid was decanted, Chlorostain BR added, dissolved and coated.

The solution was hand coated onto 20# Xerographic paper using a smooth rod. The samples were dried and tested as before.

EXAMPLE 14

The following ingredients were dissolved by mixing:

|  | GRAMS | % |
|---|---|---|
| Pentalyn 802 A (phenolic-modified pentaerythritol ester of synthetic resin) (Hercules) | 12 | 7.5 |
| Methyl carbitol | 118 | 73.8 |
| Chlorostain BR | 30 | 18.8 |

Not all of the resin dissolved in 24 hours. The clear liquid was decanted, Chlorostain BR added, dissolved and coated.

The solution was hand coated onto 20# Xerographic paper using a smooth rod. The samples were dried and tested as before.

It can be seen from Table 5 that the inks made by Examples 9-14 are not leached from the test paper until at least 15 minutes (Exs. 9, 11 and 12), and in some cases are not leached from the paper even after soaking in water for 30 minutes. On the other hand, the ink made by Example 2, using a mixture of Chlorostain BR, 30% HCl and tap water, was leached out of the test paper before 5 minutes.

Other embodiments of the invention will be apparent to those skilled in the art from consideration of the specification and practice of the invention disclosed herein. It is intended that the specification and examples be considered as exemplary only with a true scope and spirit of the invention being indicated by the following claims.

TABLE 1

| INK | SOAK TIME AT 110° F. BEFORE IMAGING WITH BLEACH | | | | | | |
|---|---|---|---|---|---|---|---|
|  | INITIAL | 5' | 15' | 30' | 60' | 120' | 240' |
| EXAMPLE 2 | DARK | NONE | NONE | NONE | NONE | NONE | NONE |

TABLE 1-continued

| INK | SOAK TIME AT 110° F. BEFORE IMAGING WITH BLEACH | | | | | | |
|---|---|---|---|---|---|---|---|
| | INITIAL | 5' | 15' | 30' | 60' | 120' | 240' |
| EXAMPLE 3 | DARK | DARK | DARK | DARK | DARK | DARK | DARK |
| EXAMPLE 4 | DARK | LIGHT | LIGHT | LIGHT | LIGHT | LIGHT | LIGHT |
| EXAMPLE 5 | DARK | NONE | NONE | NONE | NONE | NONE | NONE |
| EXAMPLE 6 | DARK | DARK | DARK | DARK | DARK | DARK | DARK |

TABLE 2

| INK | SOAK TIME AT 110° F. AFTER IMAGING WITH BLEACH | | | | | | |
|---|---|---|---|---|---|---|---|
| | INITIAL | 5' | 15' | 30' | 60' | 120' | 240' |
| EXAMPLE 2 | DARK | DARK | DARK | DARK | DARK | DARK | DARK |
| EXAMPLE 3 | DARK | DARK | DARK | DARK | DARK | DARK | DARK |
| EXAMPLE 4 | DARK | LIGHT | LIGHT | LIGHT | LIGHT | LIGHT | LIGHT |
| EXAMPLE 5 | DARK | NONE | NONE | NONE | NONE | NONE | NONE |
| EXAMPLE 6 | DARK | DARK | DARK | DARK | DARK | DARK | DARK |

TABLE 3

| PAPER | SOAK TIME AT 110 F. BEFORE IMAGING WITH BLEACH | | | | | | |
|---|---|---|---|---|---|---|---|
| | INITIAL | 5' | 15' | 30' | 60' | 120' | 240' |
| 24# OCR | DARK | DARK | DARK | DARK | DARK | DARK | DARK |
| 99# TAG | DARK | DARK | DARK | DARK | DARK | DARK | DARK |

TABLE 4

| PAPER | SOAK TIME AT 110 F. AFTER IMAGING WITH BLEACH | | | | | | |
|---|---|---|---|---|---|---|---|
| | INITIAL | 5' | 15' | 30' | 60' | 120' | 240' |
| 24# OCR | DARK | DARK | DARK | DARK | DARK | DARK | DARK |
| 99# TAG | DARK | DARK | DARK | DARK | DARK | DARK | DARK |

TABLE 5

| Ink | SOAK TIME AT 110° F. BEFORE IMAGING WITH BLEACH | | | |
|---|---|---|---|---|
| | Initial | 5 Minutes | 15 Minutes | 30 Minutes |
| Example 9 | dark | dark | none | none |
| Example 10 | dark | dark | dark | light |
| Example 11 | dark | light | none | none |
| Example 12 | dark | light | none | none |
| Example 13 | dark | dark | dark | light |
| Example 14 | dark | dark | dark | dark |
| Example 2 | Dark | None | None | None |

TABLE 6

| Ink | SOAK TIME AT 110° F. AFTER IMAGING WITH BLEACH | | | |
|---|---|---|---|---|
| | Initial | 5 Minutes | 15 Minutes | 30 Minutes |
| Example 9 | Dark | Dark | Dark | Dark |
| Example 10 | Dark | Dark | Dark | Dark |
| Example 11 | Dark | Dark | Dark | Dark |
| Example 12 | Dark | Dark | Dark | Dark |
| Example 13 | Dark | Dark | Dark | Dark |
| Example 14 | Dark | Dark | Dark | Dark |
| Example 2 | Dark | Dark | Dark | Dark |

What is claimed is:

1. A leach resistant ink composition comprising a resin, a glycol ether and a diphenyl guanidine compound, said composition being initially colorless but capable of exhibiting color upon contact with oxidizing agents and also being capable of resisting leaching in the absence of a complexing agent for said diphenyl guanidine compound.

2. The leach resistant ink composition according to claim 1, wherein said resin is an acrylic resin.

3. The leach resistant ink composition according to claim 1, further comprising a benzothiazole compound.

4. The leach resistant ink composition according to claim 2, wherein said acrylic resin is present in an amount of about 12.0% by weight, and said diphenyl guanidine compound is present in an amount of from about 12% to 21% by weight, based on the total weight of the composition.

5. The leach resistant ink composition according to claim 3, wherein said benzothiazole compound is present in an amount of about 0-21% by weight, based on the total weight of the composition.

6. The leach resistant ink composition according to claim 2, wherein said acrylic resin is a styrene acrylic polymer resin.

7. The leach resistant ink composition according to claim 1, wherein said idphenyl guanidine compound is N,N-diphenylguanidine.

8. An ink composition comprising a resin, a diphenyl guanidine compound, a glycol ether and a plasticizer, said composition being initially colorless but capable of exhibiting color upon contact with oxidizing agents and also being capable of resisting leaching in the absence of a complexing agent for said diphenyl guanidine compound.

9. The ink of claim 8, wherein said resin is an acrylic resin.

10. The ink composition according to claim 8, further comprising a benzothiazole compound.

11. The ink composition according to claim 8, further comprising a solvent.

12. The ink composition according to claim 9, wherein said acrylic resin is present in an amount of about 12.0% by weight, and said diphenyl guanidine compound is present in an amount of from about 12% to 21% by weight, based on the total weight of the composition.

13. The ink composition according to claim 10, wherein said benzothiazole compound is present in an amount of about to 0–21% by weight, based on the total weight of the composition.

14. The ink composition according to claim 8, wherein said glycol ether is present in an amount of about 29 to 59% by weight, based on the total weight of the composition.

15. The ink composition according to claim 8, wherein said plasticizer compound is present in an amount from about 0 to 2% by weight, based on the total weight of the composition.

16. The ink composition according to claim 11, wherein said solvent is present in an amount from about 0 to 37% by weight, based on the total weight of the composition.

17. The ink composition according to claim 9, wherein said acrylic resin is a styrene acrylic polymer resin.

18. The ink composition according to claim 8, wherein said glycol ether is selected from methyl cellosolve and methyl carbitol.

19. The ink composition according to claim 18, wherein the glycol ether is methyl carbitol.

20. The ink composition according to claim 10, wherein said plasticizer compound is selected from diethylene glycol, diethylene glycol monoethyl ether, diethyl phthalate, dibutyl phthalate, methyl phthalate, triethanolamine, triethyl citrate, tributoxyethyl phosphate, o,p-toluene ethyl sulfonamide, o,p-toluene sulfonamide and methyl phthalyl ethyl glycolate.

21. The ink composition according to claim 20, wherein said plasticizer compound is selected from dibutyl phthalate, diethyl phthalate and methyl phthalate.

22. The ink composition according to claim 21, wherein the plasticizer is dibutyl phthalate.

23. The ink composition according to claim 11, wherein said solvent is an alcohol.

24. The ink composition according to claim 23, wherein said solvent is isopropanol.

25. The ink composition according to claim 8, wherein said diphenyl guanidine compound is N,N-diphenylguanidine.

26. A leach resistant, security ink composition comprising:
about 29–59% by weight of a glycol ether compound;
about 1–3% by weight of a plasticizer;
about 8–15% by weight of an acrylic resin;
about 15–21% by weight of a benzothiazole compound; and
about 5–21% by weight of a diphenyl guanidine compound, each based on the total weight of the composition, said composition being initially colorless but capable of exhibiting color upon contact with oxidizing agents and also being capable of resisting leaching in the absence of a complexing agent for said diphenyl guanidine compound.

27. The leach resistant ink composition according to claim 26, wherein the glycol ether is methyl carbitol.

28. The leach resistant ink composition according to claim 26, wherein the plasticizer is dibutyl phthalate.

29. The leach resistant ink composition according to claim 26, wherein the acrylic resin is a styrene acrylic polymer resin.

30. The leach resistant ink composition according to claim 26, wherein the diphenyl guanidine compound is N,N-diphenylguanidine.

* * * * *

UNITED STATES PATENT AND TRADEMARK OFFICE
CERTIFICATE OF CORRECTION

PATENT NO. : 5,304,587
DATED : April 19, 1994
INVENTOR(S) : Oswald et al.

It is certified that error appears in the above-identified patent and that said Letters Patent is hereby corrected as shown below:

Claim 7, column 10, line 48, "1dphenyl" should read --diphenyl--.

Signed and Sealed this

Nineteenth Day of July, 1994

Attest:

BRUCE LEHMAN

Attesting Officer

Commissioner of Patents and Trademarks